(12) United States Patent
Puthenpura et al.

(10) Patent No.: US 9,338,074 B2
(45) Date of Patent: May 10, 2016

(54) METHOD AND APPARATUS FOR WIRELESS NETWORK PERFORMANCE DIAGNOSTICS VIA USER EQUIPMENT

(75) Inventors: Sarat Puthenpura, Berkeley Heights, NJ (US); Syed Anwar Aftab, Budd Lake, NJ (US); David G. Belanger, Hillsborough, NJ (US); Abbas Munawar Fazal, Lake Hiawatha, NJ (US); Sam Houston Parker, Cranbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1148 days.

(21) Appl. No.: 12/963,393

(22) Filed: Dec. 8, 2010

(65) Prior Publication Data

US 2012/0151035 A1   Jun. 14, 2012

(51) Int. Cl.
*H04L 12/26* (2006.01)
*H04W 24/06* (2009.01)

(52) U.S. Cl.
CPC ............... *H04L 43/10* (2013.01); *H04W 24/06* (2013.01); *H04L 43/0852* (2013.01); *H04L 43/0864* (2013.01); *H04L 43/0888* (2013.01)

(58) Field of Classification Search
CPC ............... H04L 43/0852; H04L 4143/0864; H04L 43/10; H04L 43/0888; H04W 24/06; G06F 15/173

USPC ........................................................ 709/224
See application file for complete search history.

(56) References Cited

U.S. PATENT DOCUMENTS

2002/0055993 A1* 5/2002 Shah et al. ..................... 709/223
2007/0280123 A1* 12/2007 Atkins et al. .................. 370/252

OTHER PUBLICATIONS

Speedtest; "What is Speedtest.net?"; Dec. 7, 2009; various excerpts from www.speedtest.net; pp. 1-7; retrieved from http://web.archive.org/web/20091202203111/http://www.speedtest.net/? on Feb. 24, 2013.*

* cited by examiner

*Primary Examiner* — Ebrahim Golabbakhsh

(57) ABSTRACT

A method, computer readable medium for diagnosing wireless network performance via a customer endpoint device are disclosed. For example, the method receives a request to perform a wireless network performance diagnostic test that is initiated by a customer endpoint device, establishes a session with the customer endpoint device, performs the wireless network performance diagnostic test in response to the request via the session using a packet generated by the customer endpoint device and provides diagnostic test data gathered from the wireless network performance diagnostic test to the customer endpoint device.

20 Claims, 8 Drawing Sheets

METHOD AND APPARATUS FOR WIRELESS NETWORK PERFORMANCE DIAGNOSTICS VIA USER EQUIPMENT

The present disclosure relates generally to a method for diagnosing wireless network performance via a customer endpoint device.

BACKGROUND

Mobile data traffic is expected to grow exponentially year over year. In this challenging and competitive environment, quality and speed of wireless data network is what separates wireless network service providers. Current methods use network based diagnostics. However, network based diagnostics may not accurately reflect what the end user is actually experiencing in terms of wireless network data performance. As a result, network based diagnostics may not provide an accurate measure of a level of performance of the wireless data network.

SUMMARY

In one embodiment, the present disclosure teaches a method and computer readable medium for diagnosing wireless network performance via a customer endpoint device. In one embodiment, the method comprises receiving a request to perform a wireless network performance diagnostic test that is initiated by a customer endpoint device, establishing a session with the customer endpoint device, performing the wireless network performance diagnostic test in response to the request via the session using a packet generated by the customer endpoint device, and providing diagnostic test data gathered from the wireless network performance diagnostic test to the customer endpoint device.

In another embodiment, the method comprises receiving a request to perform a wireless network performance diagnostic test that is initiated by the customer endpoint device, establishing a session with the customer endpoint device, performing the wireless network performance diagnostic test in response to the request via the session to determine a peak throughput for an upload throughput and a download throughput and providing the peak throughput for the upload throughput to the customer endpoint device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Embodiments of the present disclosure are directed towards a method and computer readable medium for diagnosing wireless network performance via a customer endpoint device. As discussed above, network based diagnostics may not accurately reflect what the end user is actually experiencing in terms of wireless network data performance. As a result, network based diagnostics may not provide an accurate measure of a level of performance of the wireless data network.

However, the present disclosure provides more accurate network data performance by using the customer endpoint device to perform the diagnosis. By using the customer endpoint device, the network data performance may better reflect the actual network data performance that is experienced by the customer.

The techniques discussed in the present disclosure do not use the customer endpoint device built-in browser and/or javascript engine. In addition, the techniques discussed in the present disclosure are not restricted to any specific device platform (e.g., J2ME) or with any specific wireless technology (e.g., 2G/3G/LTE/WiFi).

The present disclosure primarily focuses on the needs of a network service provider for providing network optimization. The scalable and distributed architecture is designed and implemented to cater to a very large customer base that is geographically distributed. The algorithm and/or protocols that are discussed below are designed to provide accurate results even in network location spots that have a very weak signal. The present disclosure captures the user experience without estimations but rather utilizing the actual available network bandwidth.

Figure 1:
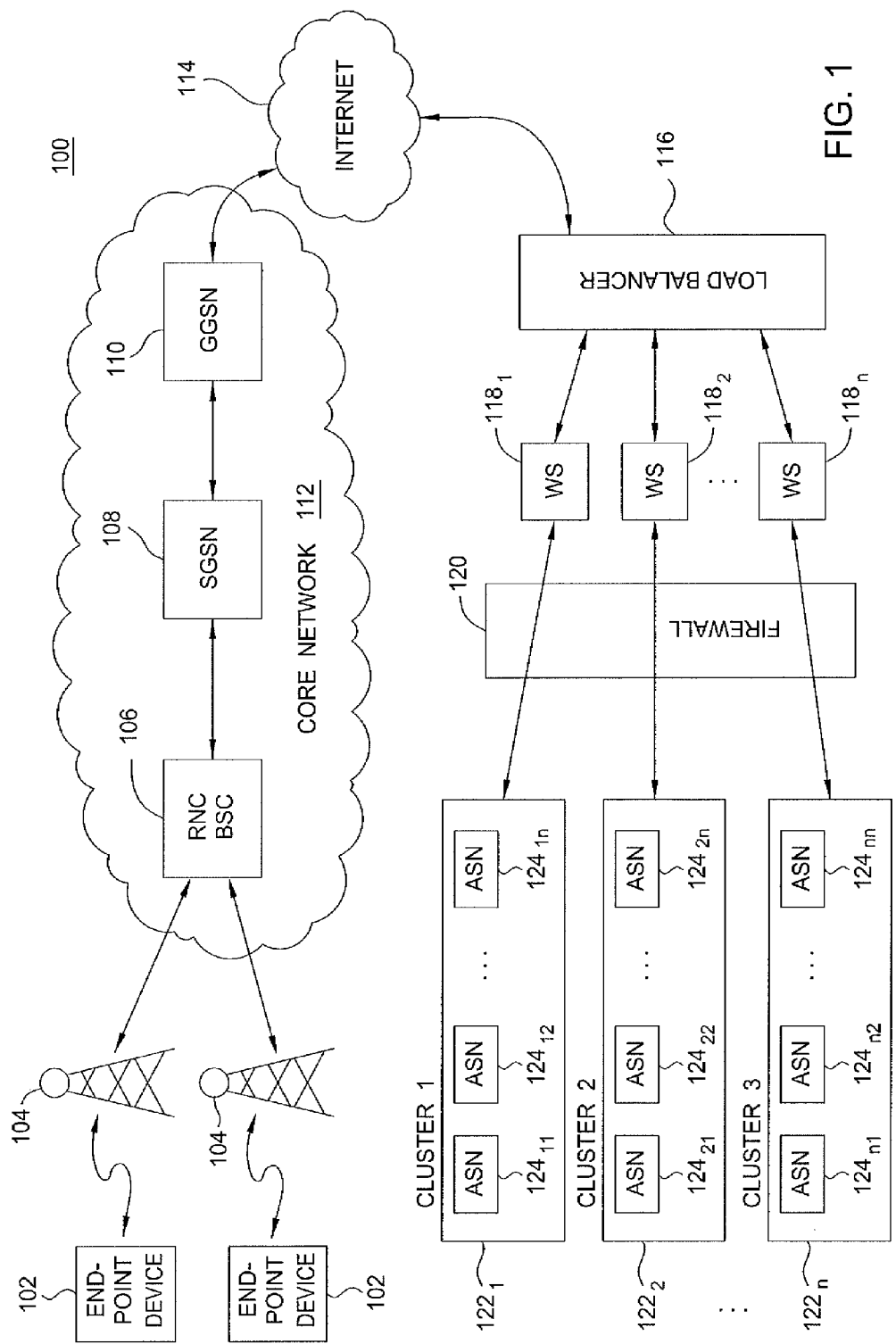
FIG. 1 illustrates one example of a communications network architecture.

FIG. 1 is a block diagram depicting one example of a communications network architecture 100 related to the current disclosure. In one embodiment, the communications network architecture 100 includes one or more customer endpoint devices 102, one or more base stations 104 (e.g., an eNodeB or base transceiver stations (BTS)), a core network 112, the internet 114, a load balancer 116, one or more web servers (WS) $118_1$-$118_n$ (also referred to as collectively and individually as WS 118), a firewall 120 and one or more clusters $122_1$-$122_n$ (also referred to collectively or individually as a cluster 122) of application server nodes (ASN) $124_{11}$-$124_{nm}$ (also referred to collectively or individually as ASN 124).

In one embodiment, the customer endpoint devices 102 may be any type of user device that may communicate wireless with the communications network architecture 100, such as for example, a cellular phone, a smart phone, a personal digital assistant, a WiFi enabled device, a wireless tablet device, a netbook, a laptop, a desktop computer and the like. The customer endpoint device 102 may be configured to include an application that runs the methods described herein that diagnose the network data performance. In other words, the customer endpoint device 102 leverages a downloaded application rather than the built in browser and/or javascript engine of the customer endpoint device 102.

In one embodiment, the core network 112 may include a radio network controller (RNC) or a base station controller (BSC) 106, a serving general packet radio services (GPRS) support node (SGSN) 108 and a gateway GPRS support node (GGSN) 110. In one embodiment, the RNC 106 provides features such as packet scheduling, radio resource control (RRC) and handover. In one embodiment, the SGSN 108 and GGSN 110 are responsible for controlling communications between the customer endpoint device 102 and the internet 114.

Figure 7:
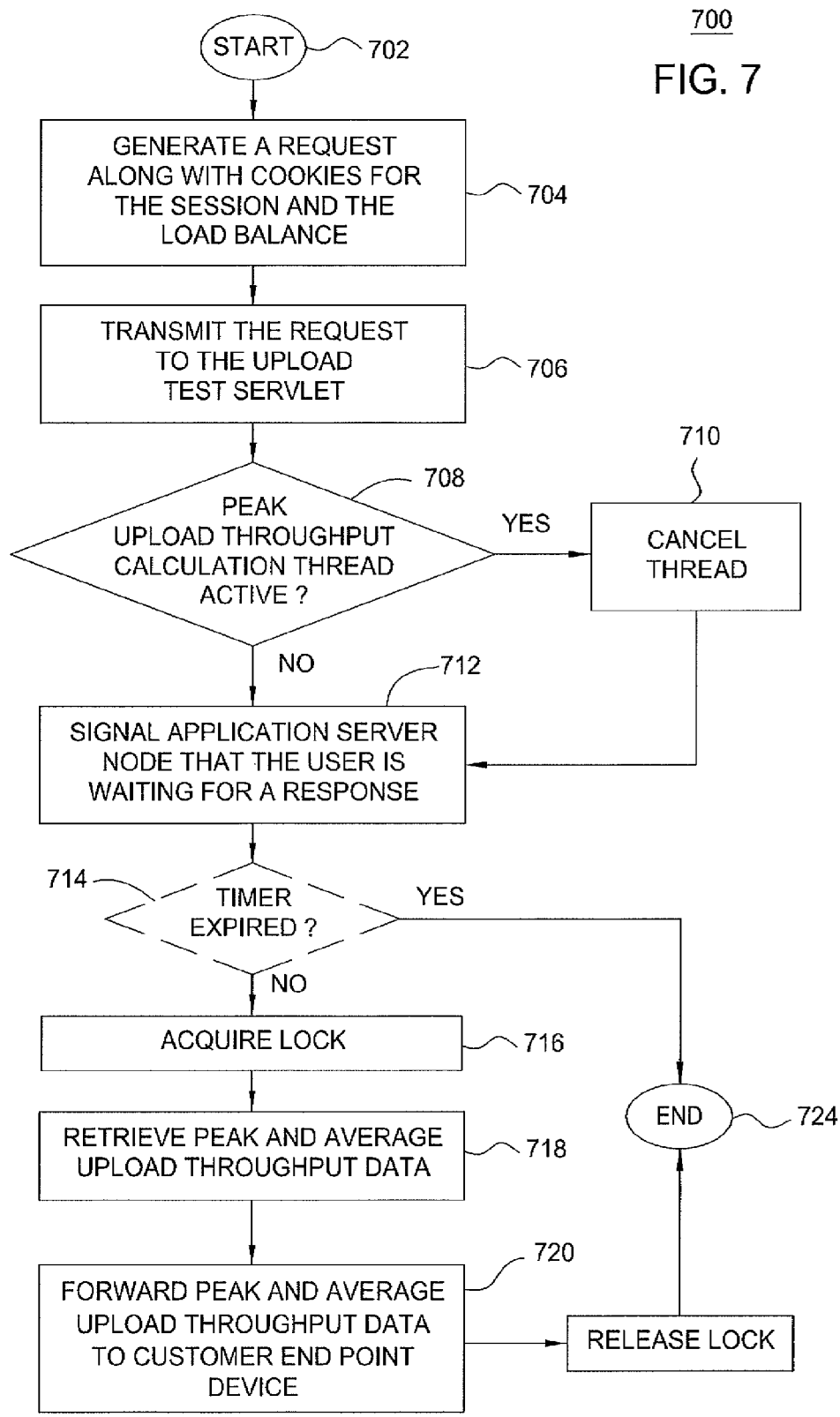
FIG. 7 illustrates a flowchart for an embodiment of a method for fetching upload throughput data.

In one embodiment, each one of the ASNs 124 may have a processor and memory configured to perform one or more of the processing steps discussed below. Examples of the processor and memory are illustrated in FIG. 7 and discussed below.

The communications network architecture 100 may also include additional hardware or network components that are not illustrated depending on the type of network. In other words, FIG. 1 only illustrates a simplified communications network architecture 100 and should not be interpreted as a limitation of the present disclosure.

Figure 2:
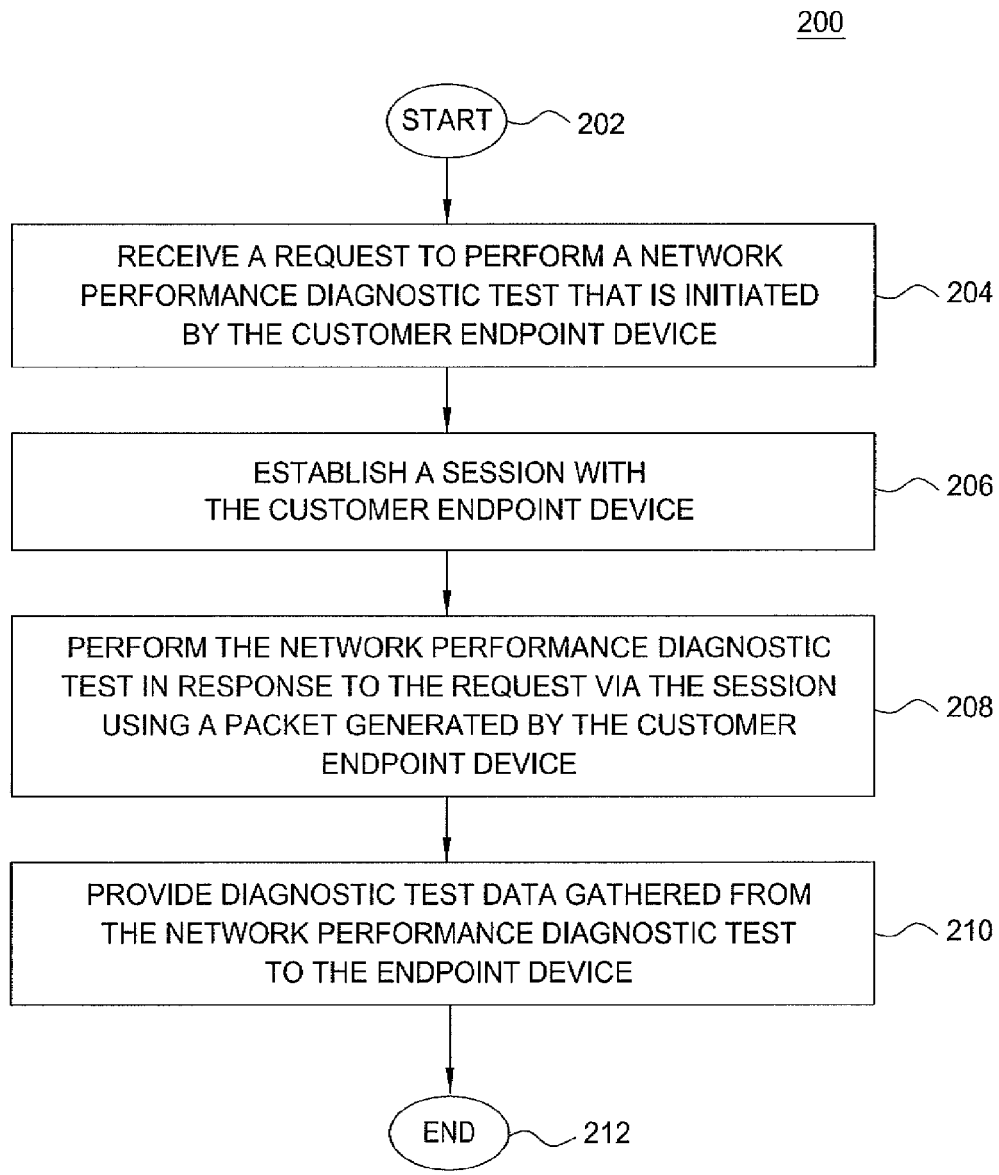
FIG. 2 illustrates a high level flowchart of one embodiment of a method for diagnosing wireless network performance via a customer endpoint device.

FIG. 2 illustrates a high level flowchart of a method 200 for diagnosing wireless network performance via a customer endpoint device. In one embodiment, the method 200 may be implemented by one of the ASNs 124 or a general purpose computer having a processor, a memory and input/output devices as discussed below with reference to FIG. 8.

The method 200 begins at step 202 and proceeds to step 204. At step 204, the method receives a request to perform a network diagnostic test that is initiated by the customer endpoint device. For example, the customer endpoint device may be configured with an application that initiates the diagnostic wireless network performance tests.

At step 206, the method 200 establishes a session with the customer endpoint device. For example, the session may be a hypertext transfer protocol (HTTP) or HTTP secure (HTTPS) session. In other words, packets are not simply sent back and forth over the internet using protocols that do not require a previously established transmission channel or data path, such as a user datagram protocol (UDP).

At step 208, the method 200 performs the wireless network performance diagnostic test in response to the request using a packet generated by the customer endpoint device. In one embodiment, the diagnostic tests may include a latency test, an upload throughput test and a download throughput test. The upload throughput test and the download throughput test may each include an average throughput and/or a peak throughput. Each one of these test is discussed in further detail below with reference to FIGS. 4-6

In one embodiment, the packet comprises a mobile application transmission control protocol internet protocol (TCP/IP) packet. For example, the TCP/IP packet may be a HTTP packet or HTTPS packet. It should be noted that the packet is not a UDP packet. The TCP/IP packet is used such that the session may be established as discussed above with reference to step 206.

At step 210, the method 200 provides diagnostic test data gathered from the wireless network performance diagnostic test to the customer endpoint device. For example, the upload throughput test is performed by the ASN. As a result, the results of the upload throughput test (e.g., peak throughput and average throughput) may be provided to the customer endpoint device by the ASN. The method 200 ends at step 212.

Figure 3:
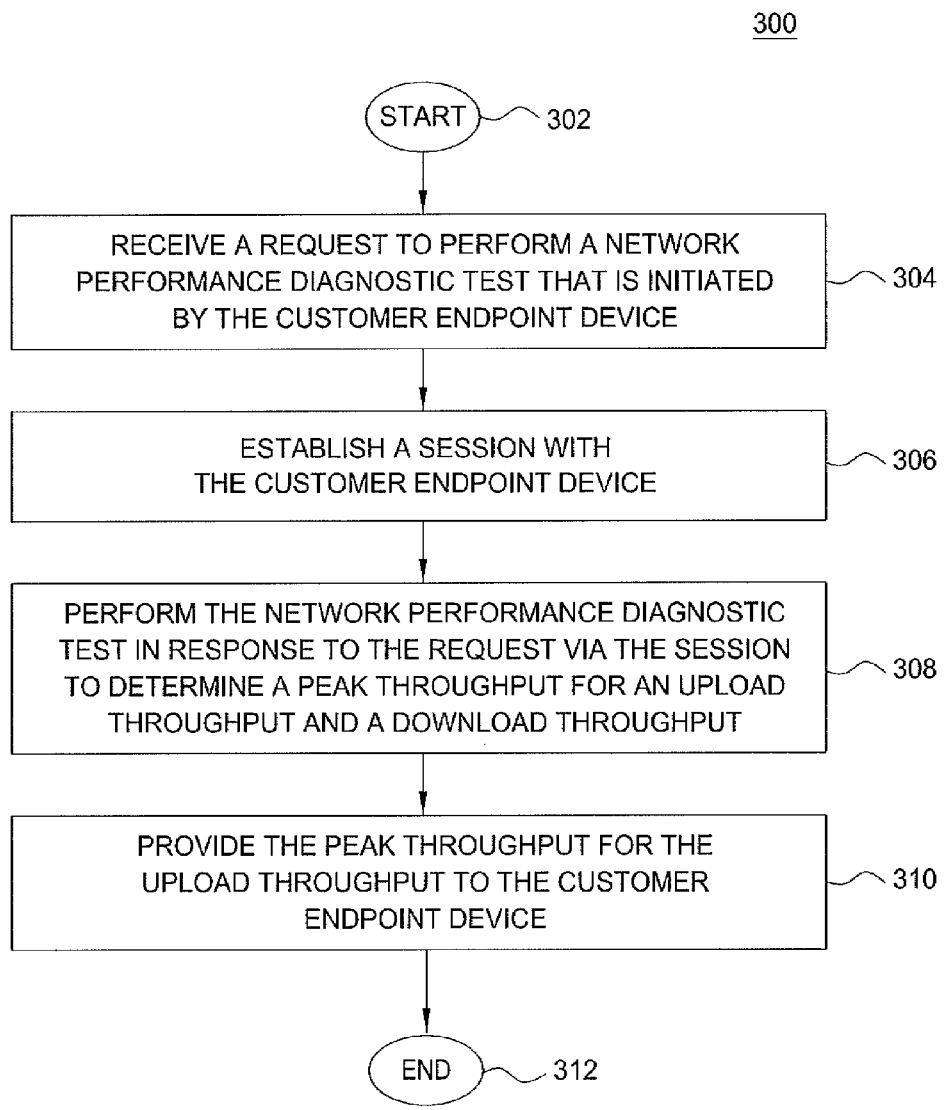
FIG. 3 illustrates a high level flowchart of another embodiment of a method for diagnosing wireless network performance via a customer endpoint device.

FIG. 3 illustrates a flowchart of a method 300 for another embodiment for diagnosing wireless network performance via a customer endpoint device. In one embodiment, the method 300 may be implemented by one of the ASNs 124 or a general purpose computer having a processor, a memory and input/output devices as discussed below with reference to FIG. 8.

The method 300 begins at step 302 and proceeds to step 304. At step 304, the method 300 receives a request to perform a network diagnostic test that is initiated by the customer endpoint device. For example, the customer endpoint device may be configured with an application that performs the initiation of the diagnostic wireless network performance tests.

At step 306, the method 300 establishes a session with the customer endpoint device. For example, the session may be a hypertext transfer protocol (HTTP) or HTTP secure (HTTPS) session. In other words, packets are not simply sent back and forth over the internet using protocols that do not require a previously established transmission channel or data path, such as a user datagram protocol (UDP).

At step 308, the method 300 performs the wireless network performance diagnostic test in response to the request to determine a peak throughput rate for an upload throughput and a download throughput. For example, the peak throughput rates may be determined using a packet generated by the customer endpoint device for the upload throughput test or a packet generated by the ASN for the download throughput test.

In one embodiment, the packet comprises a mobile application TCP/IP packet. For example, the TCP/IP packet may be a HTTP packet or HTTPS packet. It should be noted that that packet is not a UDP packet. The TCP/IP packet is used such that the session may be established as discussed above with reference to step 306.

At step 310, the method 300 provides the peak throughput rate for the upload throughput to the customer endpoint device. In one embodiment, the ASN performs the upload throughput test calculations. As a result, the results of the peak throughput rate for the upload throughput test may be provided to the customer endpoint device.

In one embodiment, the customer endpoint device is able to calculate the peak throughput rate for the download throughput. Consequently, the peak throughput rate for the download throughput may not need to be provided to the customer endpoint device because the customer endpoint device may already have the data. The method 300 ends at step 312.

Figure 4:
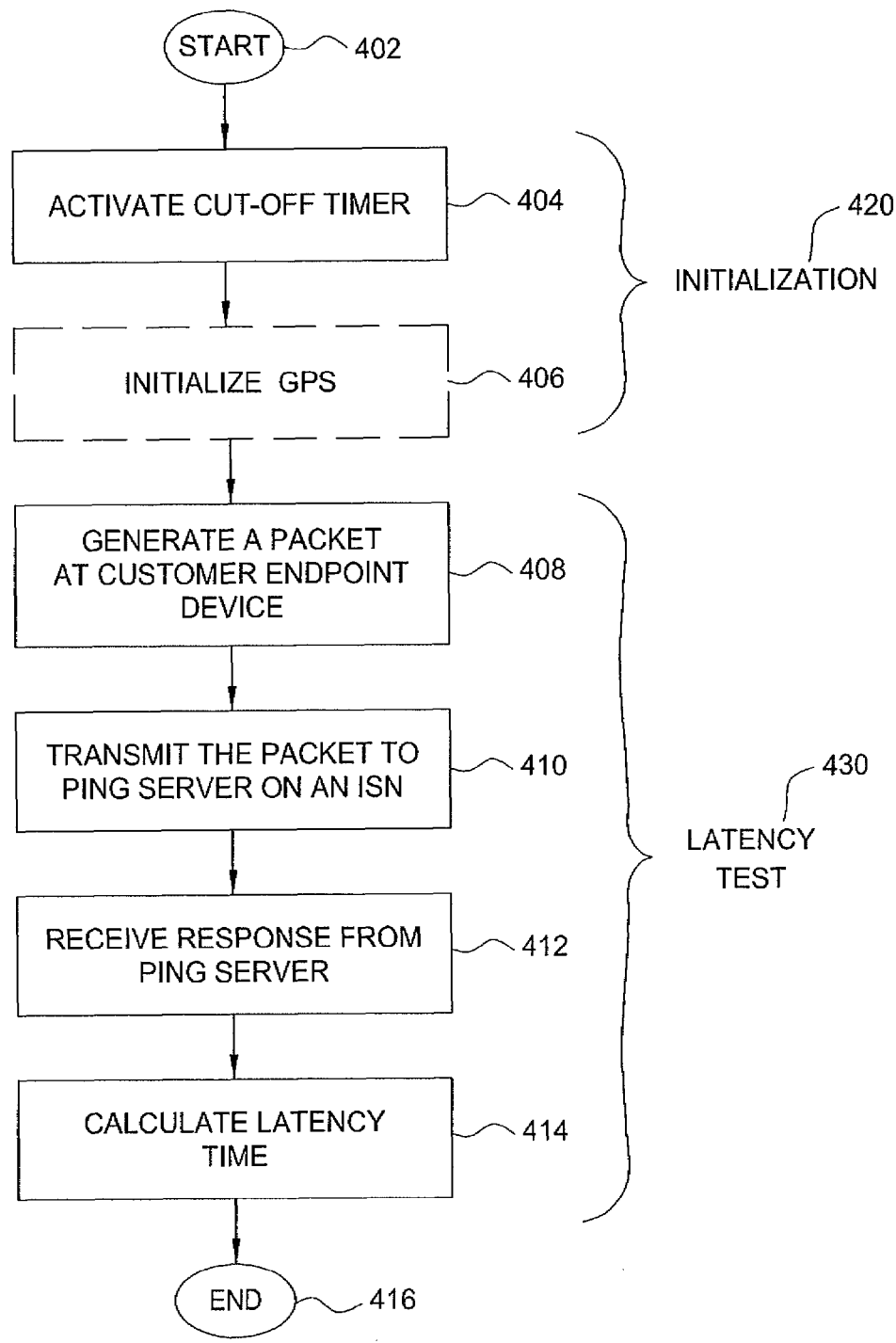
FIG. 4 illustrates a flowchart for an embodiment of a method for performing initialization and a latency test.

FIG. 4 illustrates a flowchart of a method 400 for performing initialization and a latency test. In one embodiment, the method 400 may be implemented by one of the ASNs 124, the customer endpoint device 102 or a general purpose computer having a processor, a memory and input/output devices as discussed below with reference to FIG. 8.

The method 400 starts at step 402 and then proceeds to step 404. In one embodiment, steps 404 and 406 may be considered an initialization portion 420 of the method 400. At step 404, the method 400 activates a cut off timer. In one embodiment, the cut off timer may be an overall cut off time for all the diagnostic tests (e.g., the latency test, the upload throughput test and the download throughput test) to be performed. For example, the cut off time may be set to 35 seconds.

The method 400 proceeds to an optional step 406. At optional step 406, a global positioning satellite (GPS) receiver system may be activated on the customer endpoint device. Using GPS helps to capture diagnostic test data with the best possible accuracy because the customer endpoint device may know where it is located and, thereby, help the service provider know which area is experiencing problems based upon the results of the wireless network performance diagnostic tests.

In one embodiment, steps 408-414 may be considered the latency test portion 430 of the method 400. At step 408, the method 400 generates a packet at the customer endpoint device. In one embodiment, the packet should be a small sized packet (e.g., less than a few hundred kilobytes (Kb)). For example, the small sized packet may be an HTTPS request packet.

At step 410, the method 400 transmits the packet to a ping servlet on an application server node. For example, referring to FIG. 1, the packet may be transmitted from the customer endpoint device 102, through the core node 112, the internet 114 and to a load balancer 116. Based upon a load balancing policy, the load balancer 116 forwards the packet to a WS 118. The WS 118 then forwards the packet to a cluster 122. Based upon a ASN server policy, the cluster 122 forwards the packet to an ASN 124.

In one embodiment, the ASN 124 may be configured with various servlets for the wireless network performance diagnostic tests. For example, for the latency test 430, the ASN 124 may be configured with a ping servlet. After the ping servlet receives the packet, the ping servlet may transmit a response (e.g., an "OK Response" message) back to the customer endpoint device.

At step 412, the method 400 receives a response from the ping servlet. At step 414, the method 400 calculates a latency time based upon the response. For example, the latency time may be defined as an amount of time that passed beginning with when the packet was transmitted by the customer endpoint device and ending with when the packet received the response from the ping servlet of the ASN 124. In mathematical terms, the latency time may be calculated by Equation (1) as shown below:

$$t_{RTL} = t_{UL} + t_{DL},\qquad\text{Eq. (1)}$$

where $t_{RTL}$ represents round trip latency time, $t_{UL}$ represents upstream latency and $t_{DL}$ represents downstream latency. In one embodiment, the times may be tracked in milliseconds. The method 400 ends at step 416.

Figure 5:
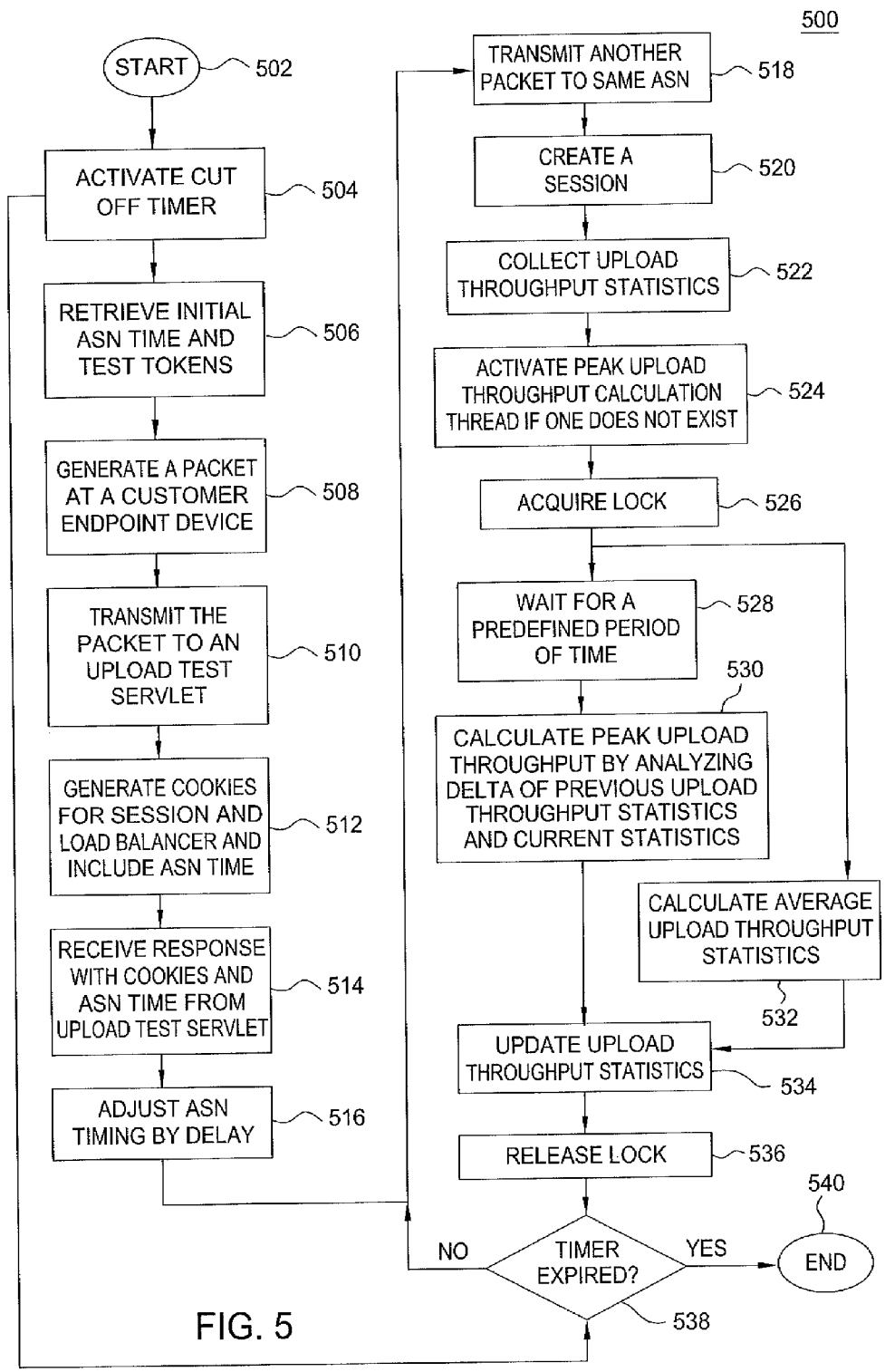
FIG. 5 illustrates a flowchart for an embodiment of a method for performing an upload throughput test for an average upload throughput and a peak upload throughput.

FIG. 5 illustrates a flowchart of a method 500 for performing an upload throughput test for an average upload throughput and a peak upload throughput. In one embodiment, the method 500 may be implemented by one of the ASNs 124, the customer endpoint device 102 and/or a general purpose computer having a processor, a memory and input/output devices as discussed below with reference to FIG. 8.

The method 500 begins at step 502 and proceeds to step 504. At step 504, the method 500 activates a cut off timer. In one embodiment, the cut off timer may be an upload throughput test cut off timer. That is, the cut off timer initialized at step 504 only applies to the upload throughput test. In one embodiment, the cut off timer may be set to 10 seconds.

In one embodiment, the cut off timer may run in parallel with the proceeding steps 506-536. In other words, the method 500 is continuously checking to see if the cut off timer has expired at step 538 as the cut off timer is started in parallel with steps 506-536 discussed below. As a result, if the cut off timer expires at any point during steps 506-536, the method 500 may be terminated at step 540.

At step 506, the method 500 retrieves an initial ASN time and a test token. At step 508, the method generates a packet at a customer endpoint device 508. In one embodiment, the packet should be a small sized packet (e.g., less than a few thousand Kb). For example, the small sized packet may be an HTTPS request packet.

At step 510, the method 500 transmits the packet to an upload test servlet. For example, referring to FIG. 1, the packet may be transmitted from the customer endpoint device 102, through the core network 112, the internet 114 and to a load balancer 116. Based upon a load balancing policy, the load balancer 116 forwards the packet to a WS 118. The WS 118 then forwards the packet to a cluster 122. Based upon a ASN server policy, the cluster 122 forwards the packet to an ASN 124.

As discussed above, the ASN 124 may be configured with various servlets for the wireless network performance diagnostic tests. For example, for the upload throughput test, the ASN 124 may be configured with an upload test servlet. After the upload test servlet receives the packet, the upload test servlet may transmit a response that includes cookies for a session and load balancer management and an ASN server time of the ASN 124 that received the packet back to the customer endpoint device.

At step 514, the method 500 receives the response with the cookies and the ASN time from the upload test servlet. At step 516, the method 500 adjusts an ASN time by a delay. The adjustment is to synchronize the customer endpoint device 102 and the ASN 124 to perform the proceeding calculations. The adjusted ASN time may be represented mathematically by Equation (2) below:

$$t_{AST} = t_{SST} + t_{RTL},\qquad\text{Eq. (2)}$$

where $t_{AST}$ represents an adjusted application server node time, where $t_{SST}$ represents a POST request application server hit time and $t_{RTL}$ is defined by Equation (1) above. In one embodiment, the time may be tracked in milliseconds. The value of $t_{SST}$ may be further defined by Equation (3) below:

$$t_{SST} = t_{RST} - t_{DL},\qquad\text{Eq. (3)}$$

where $t_{RST}$ represents a current time, which may be tracked in milliseconds. Substituting Equation (1) and Equation (3) for $t_{RTL}$ and $t_{SST}$, respectively, into Equation (2) simplifies Equation (2) into Equation (4) shown below:

$$t_{AST} = t_{RST} + t_{UL},\qquad\text{Eq. (4)}$$

At step 518, the method 500 transmits another packet to the same ASN 124. For example, the load balancer 116 will forward the packet to the same web server 118, which then forwards the packet to the same cluster 122, which then forwards the packet to the same ASN 124 that received the packet in step 510. In one embodiment, the another packet may be a block of 100 KB of POST HTTPS data that includes the session identifier cookie, the load balancer cookie and the ASN provided time.

At step 520, the method 500 creates a session between the customer endpoint device 102 and the ASN 124. At step 522, the method 500 collects upload throughput statistics. For example, the upload throughput statistics may be collected over a sampling period having increments of a predefined time period (e.g., every 1 second). The method 500 may determine how many bytes of data were uploaded within the predefined time period to provide an upload throughput rate for each sampling period. For example, upload throughput ($BW_{UL}$) may be defined as the total data transmitted in bytes ($d_{TRT}$) divided by the total transmission time ($t_{TRT}$), as illustrated by Equation (5) below:

$$BW_{UL} = d_{TRT}/t_{TRT},\qquad\text{Eq. (5)}$$

It should be noted that if the time is kept in milliseconds Equation (5) may be multiplied by 1000 to get an upload throughput in terms of bytes per second. Moreover, $d_{TRT}$ and $t_{TRT}$ may be summed over the entire sampling period from 1 to n.

At step 524, the method 500 may activate a peak upload throughput calculation thread if one does not already exist. At step 526, the method 500 acquires a lock. The method 500 acquires a lock such that processing of the currently received data packet may be completed before another data packet is sent and processed. In other words, no subsequent data packets may be processed or analyzed while the current processing is occurring with the lock acquired.

After the lock is acquired in step 526, the method 500 may perform a peak upload throughput calculation and an average upload throughput calculation in parallel as illustrated by steps 528-532. At step 528, the method waits for a predefined period of time (e.g., 1 second) to perform the peak upload throughput calculation. At step 530, the method calculates a peak upload throughput by analyzing a delta of a previous upload throughput statistic and the current upload throughput statistic. For example, if the delta of the current upload throughput statistic and the previous upload throughput statistic is greater than 0, then the peak upload throughput is the current upload throughput statistic. Otherwise, the peak upload throughput remains the previous upload throughput statistic currently stored.

In parallel with steps 528 and 530, the method 500 at step 532 calculates an average upload throughput of the collected upload throughput statistics. For example, the calculating $BW_{UL}$ over the entire sampling period from 1 to n may provide an average upload throughput.

At step 534, the method 500 updates the upload throughput statistics. For example, the peak throughput may be updated and/or the currently calculated average upload throughput may be updated.

As noted above, steps 528-534 may occur in parallel. That is, in one embodiment, the method 500 is calculating the peak upload throughput while it is also calculating the average upload throughput. In other words, steps 528-534 do not necessarily occur one after the other in a serial fashion.

In addition, in one embodiment, the peak upload throughput and the average upload throughput is calculated by the ASN 124. As a result, the peak upload throughput and the average upload throughput data may be provided to the customer endpoint device 102, as discussed below with reference to FIG. 7.

At step 536, the method 500 releases the lock. At step 538, the method 500 determines if the cut off timer has expired. If the timer has not expired, the method 500 returns to step 518 to transmit another packet and continues to collect upload throughput statistics. However, if the cut off timer has expired at step 538, then the method 500 ends.

Figure 6:
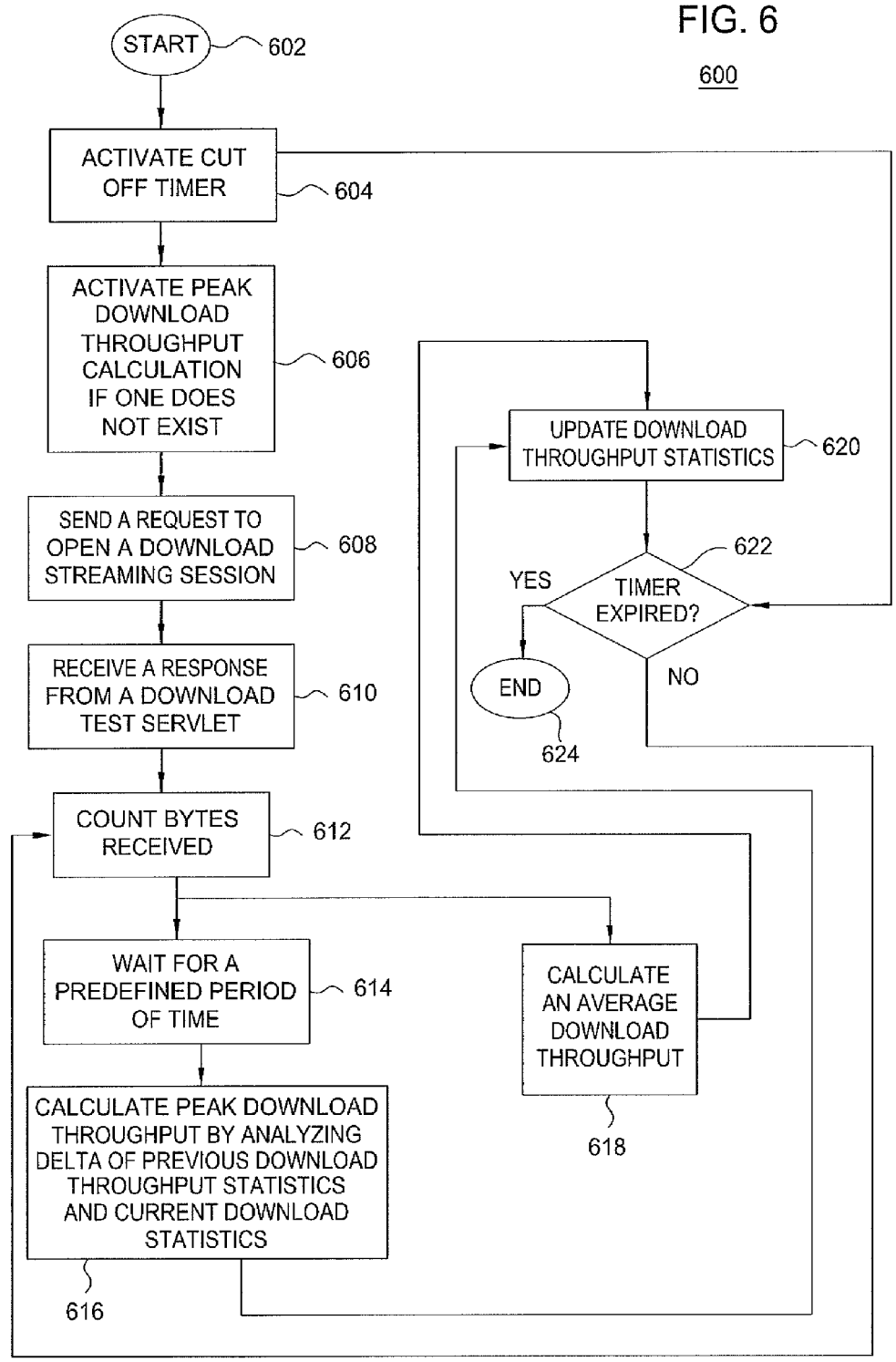
FIG. 6 illustrates a flowchart for an embodiment of a method for performing a download throughput test for an average download throughput and a peak download throughput.

FIG. 6 illustrates a flowchart of a method 600 for performing an upload throughput test for an average upload throughput and a peak upload throughput. In one embodiment, the method 600 may be implemented by one of the ASNs 124, the customer endpoint device 102 or a general purpose computer having a processor, a memory and input/output devices as discussed below with reference to FIG. 8.

The method 600 begins at step 602 and proceeds to step 604. At step 604, the method 600 activates a cut off timer. In one embodiment, the cut off timer may be a download throughput test cut off timer. That is, the cut off timer initialized at step 604 only applies to the upload throughput test. In one embodiment, the cut off timer may be set to 10 seconds.

In one embodiment, the cut off timer may run in parallel with the proceeding steps 606-620. In other words, the method 600 is continuously checking to see if the cutoff timer has expired at step 622 as the cut off timer is started in parallel with steps 606-620 discussed below. As a result, if the cut off timer expires at any point during steps 606-620, the method 600 may be terminated at step 624.

At step 606, the method 600 activates a peak download throughput calculation thread if one does not exist. At step 608, the method 600 sends a request to open a download streaming session. For example, referring to FIG. 1, the packet may be transmitted from the customer endpoint device 102, through the core node 112, the internet 114 and to a load balancer 116. Based upon a load balancing policy, the load balancer 116 forwards the packet to a WS 118. The WS 118 then forwards the packet to a cluster 122. Based upon a ASN server policy, the cluster 122 forwards the packet to an ASN 124.

As discussed above, the ASN 124 may be configured with various servlets for the wireless network performance diagnostic tests. For example, for the download throughput test, the ASN 124 may be configured with a download test servlet. After the download test servlet receives the packet, the download test servlet may transmit a response back to the customer endpoint device.

At step 610, the method 600 receives a response from the download test servlet. Once the response is received, a download streaming session has been established between the customer endpoint device 102 and the ASN 124.

At step 612, the method 600 counts the bytes that are received over the download streaming session. Based upon the number of bytes received, the customer endpoint device may begin to calculate a peak download throughput and an average download throughput in parallel as illustrated by steps 614-618 in FIG. 6.

At step 614, the method 600 begins calculating the peak download throughput by waiting for a predefined period of time (e.g., 1 second). At step 616, the method 600 calculates a peak download throughput by analyzing a delta of a previous download throughput statistic and a current download throughput statistic. For example, if the delta of the current download throughput statistic and the previous download throughput statistic is greater than 0, then the peak download throughput is the current download throughput statistic. Otherwise, the peak download throughput remains the previous download throughput statistic currently stored.

In parallel to steps 614 and 616, the method 600 at step 618 calculates an average download throughput. For example, the download throughput ($BW_{DL}$) may be defined as the data transmitted in bytes ($d_{TR}$) divided by the transmission time ($t_{TR}$), as illustrated by Equation (6) below:

$$BW_{UL} = d_{TR}/t_{TR},  \qquad \text{Eq. (6)}$$

The transmission time, $t_{TR}$, may be obtained by subtracting the download test duration ($t_{DTD}$) by the upstream latency ($t_{UL}$) as illustrated by Equation (7) below:

$$t_{TR} = t_{DTD} - t_{UL},  \qquad \text{Eq. (7)}$$

It should be noted that if the time is kept in milliseconds, Equation (6) may be multiplied by 1000 to get an upload throughput in terms of bytes per second. Moreover, $d_{TR}$ and $t_{TR}$ may be summed over the entire sampling period from 1 to n to provide the average download throughput.

At step 620, the method 600 updates the peak download throughput and/or the average download throughput. As noted above, steps 614-620 may occur in parallel. That is, in one embodiment, the method 600 is calculating the peak download throughput while it is also calculating the average download throughput. In other words, steps 614-620 do not necessarily occur one after the other in a serial fashion.

At step 622, the method 600 determines if the cut off timer has expired. If the cut off timer has not expired, the method 600 returns to step 612 to continue counting bytes received over the download streaming session. However, at step 622, if the method 600 determines that the cut off timer has expired, then the method 600 ends at step 624.

FIG. 7 illustrates a flowchart of a method 700 for fetching upload throughput data. In one embodiment, the method 700 may be implemented by one of the ASNs 124, the customer endpoint device 102 or a general purpose computer having a processor, a memory and input/output devices as discussed below with reference to FIG. 8.

As discussed above, the upload throughput data may be calculated by the ASN 124. As a result, the customer endpoint device requests to obtain this data from the ASN 124. In contrast, the download throughput data may be calculated by the customer endpoint device locally. As a result, the customer endpoint device already has the download throughput data and need not request this data from the ASN 124.

The method 700 begins at step 702 and proceeds to step 704. At step 704 the method generates a request along with cookies for the HTTPS session and load balancer. This is to ensure that the same ASN 124 that was used for the upload throughput test is queried for the upload throughput data that was collected during the upload throughput test.

At step 706, the method 700 transmits the request to the same upload test servlet of the same ASN 124 selected during the upload throughput test performed in FIG. 5. At step 708, the method 700 determines if a peak upload throughput calculation thread is active. If the thread is active, then the method 700 proceeds to step 710 where the method 700 cancels the thread. The method 700 then proceeds to step 712. However, if the thread is not active, then the method 700 may proceed directly to step 712.

At step 712, the method 700 signals the throughput sampling process on the ASN that the user is waiting for a response. For example, a message may be sent to the process on the ASN 124 to indicate that the user is waiting for the calculated data. The sampling process terminates gracefully on this signal and quickly computes the results.

At step 714, the method 700 performs an optional step to determine if a timer has expired. For example, a timer may be used to ensure that the user is not waiting indefinitely for the requested data. For example, in one embodiment, the timer may be set to 10 seconds. If the method 700 determines that the timer has expired, the method 700 may proceed to step 724 where the method 700 ends. However, if the method 700 determines that the timer has not expired, then the method 700 proceeds to step 716.

At step 716, the method 700 acquires a lock. This is to ensure that the ASN 124 obtaining the requested data does not begin processing subsequent packets before obtaining the requested data.

At step 718, the method 700 retrieves the peak upload throughput and the average upload throughput data. At step 720, the method 700 forwards the peak upload throughput and the average upload throughput data to the customer endpoint device.

At step 722, the method 700 releases the lock. The method 700 proceeds to step 724 where the method 700 ends.

In one embodiment, the sequence of method 400 (after initialization), 500, 600 and 700 may be changed based on the requirement of a particular deployment.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 3-7 that recite a determining operation, or involve a decision, do not necessarily require that both branches of the determining operation be practiced. In other words, one of the branches of the determining operation can be deemed as an optional step.

As a result, the present disclosure provides a more accurate reflection of the actual network data performance experienced by the end user. This is because the network data performance is tested from the end user's perspective rather than from the network's perspective. Moreover, the gathered wireless network performance diagnostic test data collected (e.g., the latency, the peak upload and download throughput and the average upload and download throughput) can be forwarded to the service provider. The service provider may then use this information to determine whether additional base stations or cell towers need to be placed at the end user's location. As discussed above, in FIG. 4, the customer endpoint device may be equipped with GPS receiver to provide location information of where the network data performance is being experienced.

Figure 8:
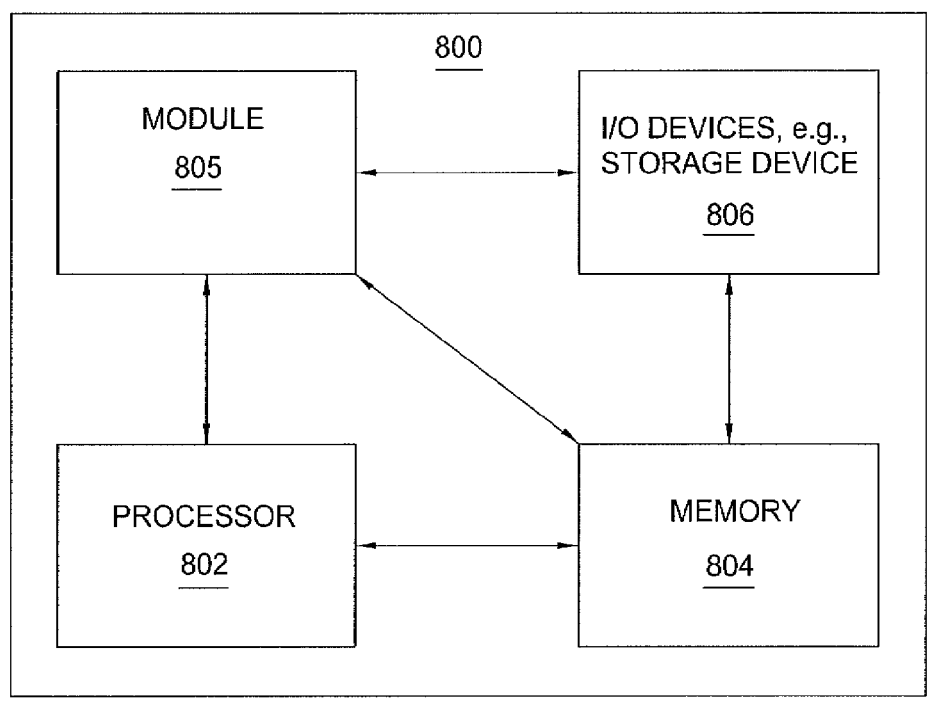
FIG. 8 illustrates a high-level block diagram of a general-purpose computer suitable for use in performing the functions described herein.

FIG. 8 depicts a high-level block diagram of a general-purpose computer suitable for use in performing the functions described herein. As depicted in FIG. 8, the system 800 comprises a processor element 802 (e.g., a CPU), a memory 804, e.g., random access memory (RAM) and/or read only memory (ROM), a module 805 for diagnosing wireless network performance via a customer endpoint device, and various input/output devices 806 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 805 for diagnosing wireless network performance via a customer endpoint device can be loaded into memory 804 and executed by processor 802 to implement the functions as discussed above. As such, the present method 805 for diagnosing wireless network performance via a customer endpoint device (including associated data structures) of the present disclosure can be stored on a non-transitory (tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for diagnosing a wireless network performance, comprising:

receiving, by a processor of an application node, a request to perform a wireless network performance diagnostic test that is initiated by a customer endpoint device;

activating, by the processor, a global positioning satellite receiver on the customer endpoint device to obtain a location of the customer endpoint device;

establishing, by the processor, a session with the customer endpoint device using a cookie sent by the processor to the customer endpoint device in response to the request;

performing, by the processor, the wireless network performance diagnostic test in response to the request via the session using a packet generated by the customer endpoint device after the customer endpoint device acquires a lock, wherein the wireless network performance diagnostic test is performed by the application server node in a cluster of a plurality of application server nodes; and providing, by the processor, diagnostic test data gathered from the wireless network performance diagnostic test to the customer endpoint device and a service provider of a wireless network, wherein the diagnostic test data allows the service provider to determine whether an additional base station should be deployed at the location based upon the wireless network performance diagnostic test.

2. The method of claim 1, wherein the packet comprises a mobile application transmission control protocol internet protocol packet.

3. The method of claim 2, wherein the mobile application transmission control protocol Internet protocol packet is in accordance with a hypertext transfer protocol request.

4. The method of claim 1, wherein the wireless network performance diagnostic test comprises a latency test using the packet generated by the customer endpoint device.

5. The method of claim 1, wherein the wireless network performance diagnostic test comprises an upload throughput test using the packet generated by the customer endpoint device.

6. The method of claim 5, wherein the upload throughput test determines an average throughput.

7. The method of claim 5, wherein the upload throughput test determines a peak throughput.

8. The method of claim 5, wherein data generated from the upload throughput test is received from the application server node.

9. The method of claim 1, wherein the wireless network performance diagnostic test comprises a download throughput test using a packet generated by the application server node.

10. The method of claim 9, wherein the download throughput test determines an average throughput.

11. The method of claim 9, wherein the download throughput test determines a peak throughput.

12. A non-transitory computer-readable medium storing a plurality of instructions which, when executed by a processor of an application node, cause the processor to perform operations for diagnosing a wireless network performance, the operations comprising:

receiving a request to perform a wireless network performance diagnostic test that is initiated by a customer endpoint device;

activating a global positioning satellite receiver on the customer endpoint device to obtain a location of the customer endpoint device;

establishing a session with the customer endpoint device using a cookie sent by the processor to the customer endpoint device in response to the request;

performing the wireless network performance diagnostic test in response to the request via the session using a packet generated by the customer endpoint device after the customer endpoint device acquires a lock, wherein the wireless network performance diagnostic test is performed by the application server node in a cluster of a plurality of application server nodes; and providing diagnostic test data gathered from the wireless network performance diagnostic test to the customer endpoint device and a service provider of a wireless network, wherein the diagnostic test data allows the service provider to determine whether an additional base station should be deployed at the location based upon the wireless network performance diagnostic test.

13. The non-transitory computer readable medium of claim 12, wherein the packet comprises a mobile application transmission control protocol internet protocol packet.

14. The non-transitory computer readable medium of claim 12, wherein the wireless network performance diagnostic test comprises a latency test using the packet generated by the customer endpoint device.

15. The non-transitory computer readable medium of claim 12, wherein the wireless network performance diagnostic test comprises an upload throughput test using the packet generated by the customer endpoint device.

16. The non-transitory computer readable medium of claim 15, wherein the upload throughput test determines an average throughput and a peak throughput.

17. The non-transitory computer readable medium of claim 15, wherein data generated from the upload throughput test is received from the application server node.

18. The non-transitory computer readable medium of claim 12, wherein the wireless network performance diagnostic test comprises a download throughput test using a packet generated by the application server node.

19. The non-transitory computer readable medium of claim 18, wherein the download throughput test determines an average throughput and a peak throughput.

20. A method for diagnosing wireless network performance, comprising:

receiving, by a processor of an application server node, a request to perform a wireless network performance diagnostic test that is initiated by a customer endpoint device;

activating, by the processor, a global positioning satellite receiver on the customer endpoint device to obtain a location of the customer endpoint device;

establishing, by the processor, a session with the customer endpoint device using a cookie sent by the processor to the customer endpoint device in response to the request;

performing, by the processor, the wireless network performance diagnostic test in response to the request via the session to determine a peak throughput for an upload throughput after the customer endpoint device acquires a lock, wherein the wireless network performance diagnostic test is performed by the application server node in a cluster of a plurality of application server nodes; and providing, by the processor, the peak throughput for the upload throughput to the customer endpoint device and a service provider of a wireless network, wherein the diagnostic test data allows the service provider to determine whether an additional base station should be deployed at the location based upon the wireless network performance diagnostic test.

* * * * *